June 5, 1956  R. FENNEMA ET AL  2,749,083
COUNTERBALANCE SPRING UNIT FOR CONDUIT GATE VALVES
Filed Sept. 27, 1951  2 Sheets-Sheet 1
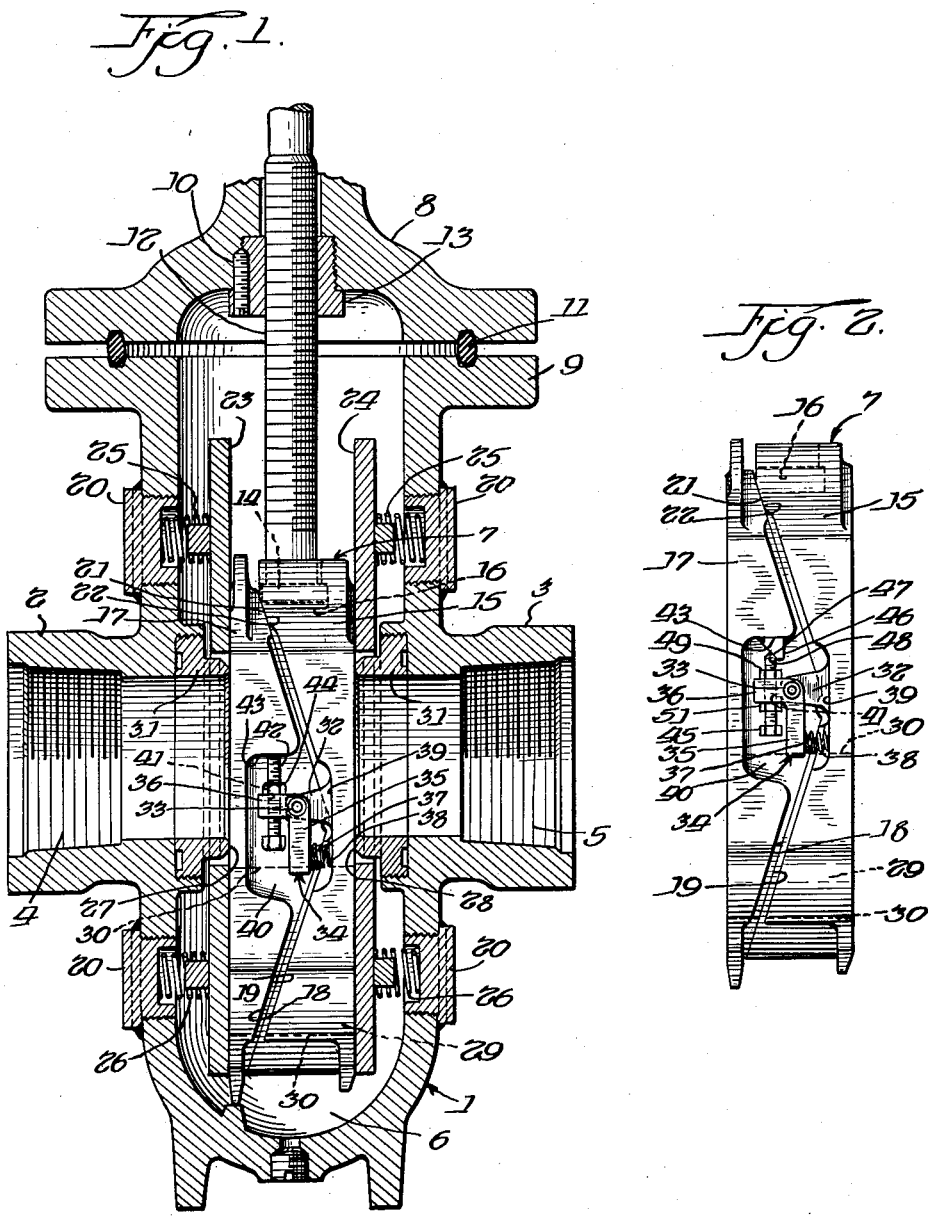
Inventors.
Richard Fennema,
Andrew E. Anderson, &
Walter L. Krueger.
By Joseph O. Lange Atty.

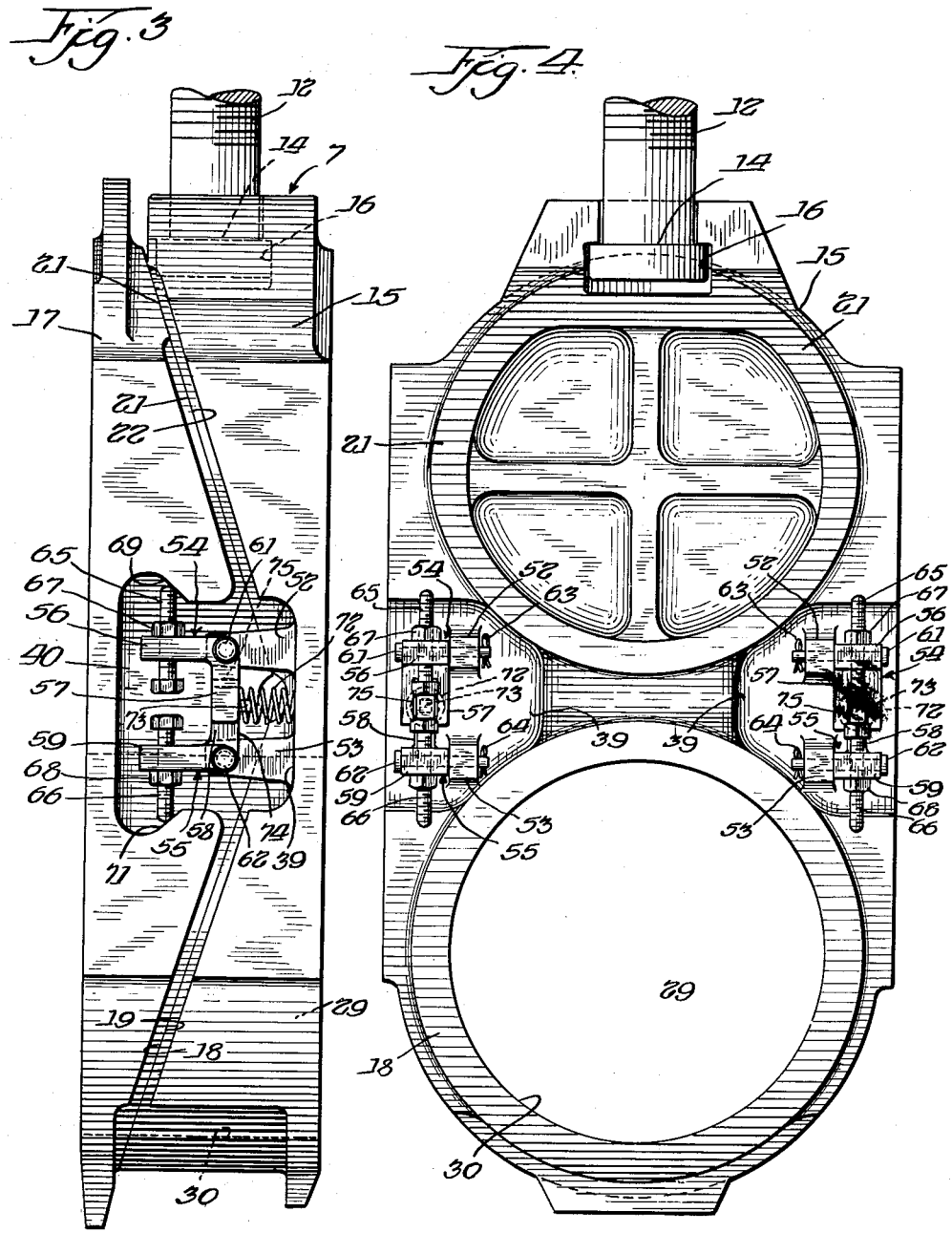

United States Patent Office 2,749,083
Patented June 5, 1956

2,749,083

COUNTERBALANCE SPRING UNIT FOR CONDUIT GATE VALVES

Richard Fennema, Chicago, Andrew E. Anderson, Berwyn, and Walter L. Krueger, Chicago, Ill., assignors to Crane Co., Chicago, Ill., a corporation of Illinois Application September 27, 1951, Serial No. 248,554

5 Claims. (Cl. 251—167)

This invention pertains generally to conduit type gate valves, and, more particularly, it is concerned with an improvement over the type of conduit valve shown in U. S. Patent No. 2,504,924 issued April 18. 1950.

At the outset, in order to obtain a better understanding of the background of this invention, it should be understood that in the conduit type of valves in which a pair of gates or discs are placed in back-to-back or juxtaposed position with converging angularly disposed surfaces defining such contact relationship, the matter of properly supporting the discs or gates and preventing sticking is a critical and an important one, particularly realizing that in this type of construction one disc termed the stem disc carries or supports the other disc which is termed the floating disc. These must be suitably drawn together upon movement in opening and closing the valve.

Heretofore, a significant and important objection present in this structure has been the inability to obtain a satisfactory retracting or collapsing mechanism for this type of valve to avoid sticking or binding in the casing.

Therefore, one of the more important objects of this construction is to provide for economical and convenient means comprising a counterbalance spring and angular lever unit useful in conduit type valves whereby to aid the discs in effecting collapsibility from the pressures exerted by the body ring plates, the latter members having suitable resilient means in back and supporting them to overcome or counterbalance the weight of the floating disc.

As will hereinafter be disclosed in greater detail, the lifting of the floating disc is preferably assisted by means of angularly formed pivotally mounted levers or arms projecting from the stem disc portion and to which the counterbalance units of this invention are attached.

Therefore, another important object accomplished by this invention is the elimination of the greater part of the lifting effort or action previously required as a function of the wedging surface of the stem disc. The instant structure embodying our invention reduces the probability of objectionable wedging action taking place in the event that the lazy disc or floating disc lags or tends to slip back for any reason in the course of its travel in opening or closing the valve.

Another important object of this invention is to provide a structure in which a pair of counterbalance spring units are used, the latter units being preferably positioned on each side of the vertical center line of the valve, in place of the usual single spring employed between the two disc portions. The unit is preferably located within the top annular bearing area of the wedging surfaces between the discs and by the use of a pair of springs an improved counterbalance arrangement is provided for the floating disc half.

Another object of the invention is to provide for an adjustment feature incorporated in the unit which allows for easy handling of variations in such closure member or casing as may occur either in the castings or in the machining during the course of manufacture.

A further important object is to provide a structure in which a counterbalance result is effective in both opening and closing directions of the valve, and similarly is independently adjustable.

In summary, an important object is to provide for a structure in which a plurality of spring units provide the counterbalance arrangement, allowing for a simple but wide range of adjustability, and also permitting greater ease of assembly. Also, as will hereinafter become apparent, with the counterbalance spring units located in proximity to the outer side limits of the disc when viewed transversely, there is provided better accessibility for adjustment.

Other objects and advantages will become more readily apparent upon proceeding with the description read in light of the accompanying drawings, in which, Fig. 1 is a fragmentary sectional assembly view of a preferred embodiment of our invention.

Fig. 2 is a side exterior view of the assembled discs embodying a mdified form of our invention.

Fig. 3 is a fragmentary side exterior view of a conduit valve assembly employing our invention.

Fig. 4 is a plan view of one of the discs in the assembly shown in Fig. 3.

Similar reference numerals refer to similar parts throughout the several views.

Referring now to Fig. 1, a valve casing, generally designated 1, is shown having the usual inlet and outlet connections at 2 and 3 respectively for attachment to a pipe line (not shown) as indicated by means of the threads 4 and 5 respectively. The valve casing is provided with a central or inner chamber 6 within which a reciprocally movable closure member generally designated 7 is received and is actuated as hereinafter described.

At the upper end of the valve chamber 6, a bonnet 8 is attached by means of bolts (not shown) to the casing bonnet flange 9 and is held in fluid sealing relation therewith in the usual manner by means of the ring gasket 11.

Projecting through the bonnet 8, a stem 12 is journalled within a stem hole bushing 13 mounted in threaded relation thereto, the latter bushing member being non-rotatably held by means of the threaded screw 10 as indicated. Thus, it should be apparent that by the mere rotation of the stem 12 upon its threads within the bushing 13, the stem is reciprocally movable thereby to effect a similar motion to the closure member 7 in the opening and closing movements of the valve.

A handwheel (not shown) is used to suitably rotate the stem member upon the threads indicated so as to effect said reciprocating motion to the stem 12 and the disc or closure assembly generally designated 7. The latter disc member assembly is provided with the stem disc 15 having a stem head 14 engaging the said stem disc which is suitably chambered or recessed as at 16 to receive the said stem head.

The closure member, generally designated 7, also consists of a floating disc 17, both discs 15 and 17, as shown, having therebetween for wedging purposes occurring upon predetermined relative movement the inclined and converging contact wedge surfaces 18 and 19 as indicated at the lower half portion thereof and with the inclined converging surfaces 21 and 22 at the upper half portion thereof.

Preferably, although not necessarily, the assembled closure member 7 is guided by means of the oppositely disposed guides 23 and 24, the latter members being resiliently mounted at their upper and lower portions by means of the coiled springs 25 and 26, held in place by means of the insertable plugs 20, the springs bearing against the back of the guides as indicated.

Other detailed description of these latter features and their functioning is not deemed necessary, since they form a part of the subject matter of the patent above referred to. Each of the discs makes contact at the annular raised faces 27 and 28 in the closed position of the valve which is the position illustrated, while, in the open position, since each of the discs is ported, as indicated by the dotted lines 30, the complementary through-port 29 is defined in the raised or open position of the valve.

As indicated in the assembly shown in Fig. 1, in the closed position of the valve, the lowermost end portion of the floating disc 17 contacts the body projection thus to serve as a stop means therefor, while in the opposite or open position of the valve, the uppermost end of the disc 17 will contact the under surface of the stem hole bushing 13. These stops thus permit of relative movement between the disc members 15 and 17 at the respective end limits of their movement in opening and closing the valve.

The body seat rings 31, preferably renewable, serve as the actual contact areas for the discs in such open or closed position of the valve.

It is, of course, desirable that the first and second discs when the valve is opened or closed, should be collapsed or retracted, preferably aided by the respective pressures exerted by the resiliently mounted body ring plates 23 and 24, and this is further accomplished by a novel means as hereinafter described. Specifically, the structure resists the usual tendency of the floating disc to stick. Positioned on opposite side portions of the stem disc 15, integral apertured lugs 32 are provided to receive the pins 33 upon which the angular lever, generally designated 34, is mounted. Each lever has the lower depending portion 35 and the angular extension thereto designated 36. The pin 33 allows for pivotal movement of the angular lever 34. In the lower end portion of the extension 35, a lug 37 is preferably provided upon which to mount a coil spring 38. The latter member bears at its opposite end against the transverse surface 39 of the stem supported part of the disc portion 15. On the horizontal extension 36 of the counterbalancing angular lever 34, a threaded aperture 41 is provided which receives the bolt 42, and of which one end portion thereof abuts against the surface 43 of the floating disc 17 in the closed position of the valve, as shown. The locknut 44 completes this assembly and by employing the threaded member 42, it allows for the desired adjustability with respect to the angular position of the portion 35 when compressing the coiled spring 38.

Therefore, in the operation of the closure member 7 in opening the valve from the position indicated (closed) the stem supported part of the disc 15 will initially move upward, thus drawing with it the pin 33 and the pivotally mounted counterbalance unit comprising the angular lever 34, the bolt 42 by reason of its abutment against the surface 43, allowing for pivotal movement of the depending portion 35 of the lever 34. Such movement will compress the spring 38 and cause the horizontal portion of the lever 34 to be correspondingly moved pivotally, carrying with it downwardly the bolt 42 to lower the end contact of the latter with the surface 43. A counterbalancing effect is thus produced which allows the wedging effect therebetween on the surfaces 18 and 19 and 21 and 22 to be relieved substantially. The floating disc is thereby slightly moved inwardly by pressure of spring loaded guides 23 and 24 being exerted upon discs to relieve its seat bearing load at 27 and thus minimize the prior tendency to stick. The valve is accordingly easier to operate.

It should, of course, be appreciated that in one form of the structure, the retractibility and adjustability of the disc referred to in connection with Fig. 1 may be accomplished in the following manner. In Fig. 2, the first and second discs 15 and 17 shown more clearly in a modification of Fig. 1 are provided with the lug 32 on the stem supported part of disc 15 and with the mounting for the angular lever generally designated 34 provided by the pin 33. The lever has the upper and lower extensions horizontally and vertically, as at 36 and 35 respectively. However, instead of having the threaded bolt 45 abut flatly against the surface 43, a lug 46 is provided having an inclined surface 47 to receive a similarly threaded conical end portion 48 on the bolt 45 having the upper and lower locknuts 49 and 51. Thus, in this structure, the net result of the contact of the threaded portion angularly formed annularly on 48 will be to move against the inclined surface 47 on the lug 46 and thus draw the floating disc half inwardly to relieve the seating load. It also improves the accuracy of the adjustment on the threaded screw in its lifting effect when biased with the angular lever 34 and the spring 38. Thus, the latter spring member is compressed in the same manner as described in connection with Fig. 1.

Referring now to the modified form of structure shown in Figs. 3 and 4 wherein the closure member, generally designated 7, is provided with the previously described stem actuated portion of the disc 15 and the floating disc 17 with the head 14 of the stem 12 is receivable, as previously described, within the recessed portion 16 of the first disc 15. In this modification, the said closure member is made structurally suitable for providing the said counterbalancing arrangement effective in both the opening and closing movements of the valve.

Specifically, attention is directed to Fig. 3 in which the stem disc portion 15 is provided with the integral upper and lower lugs 52 and 53 whereby to receive and pivotally mount the upper and lower angular levers generally designated 54 and 55 respectively. It will be noted that the upper angular lever 54 consists of a horizontally extending portion 56 and the bifurcated depending lower extension 57, in which the bifurcation referred to, as more clearly shown in Fig. 4, serves the purpose of receiving therebetween the upper or vertical extension 58 of the lower angular lever 55. The latter member is provided with the horizontal extension 59. Both the upper and lower angular levers are pivotally mounted in the usual manner as described in connection with Figs. 1 and 2 by means of the pins 61 and 62 respectively in each case and pinned in place to the lugs by means of the respective cotter pins 63 and 64. Each of the angular levers is positioned on a side of the center line of the stem actuated disc portion 15, as shown more clearly in Fig. 4.

Also, in the same arrangement as previously described in connection with Figs. 1 and 2, each of the angular levers 54 and 55 is provided with an adjustable bolt 65 and 66 axially movable relative to the upper and lower horizontal lever portions 56 and 59 respectively, the said adjusting bolts being locked in place by means of the locknuts 67 and 68. In this modified form, the ends of the said bolts 65 and 66 preferably bear against inclined surfaces 69 and 71, as illustrated, thereby following the general method of making the bearing contact similar to that described in connection with the modified form in Fig. 2.

It should, of course, be understood that if desired a flat abutting surface contact may be substituted for the bolts at the chamber 40, as shown and described in connection with Fig. 1, so that such alternate is clearly permissible within the purview of this invention. In view of the fact that both angular levers are pivotally mounted, as at 61 and 62, and since they are also pivotally mounted on the disc 15, the relative pivotal movements thereof may occur substantially together when the aforementioned transverse movement takes place between the discs 16 and 17.

Accordingly, it has been found desirable to employ a single coil spring 72 which bears against the outer bifurcated portion 57 of the upper angular lever 54 and is preferably positioned on an integral lug 73 forming a part of the upper extending angular portion 58 of the lower lever generally designated 55. Thus, it should be understood that upon the occurrence of inward pivotal movement of the upper and lower portions 57 and 58 of the respective angular levers, whether together or separately, the coil spring 72 will resist or counterbalance the force inwardly of the respective upper and lower lever portions 57 and 58 pivotally in a direction toward the surface 39. It should, of course, be appreciated, therefore, that when the upper angular lever 54 is pivotally moved by virtue of the contact of the bolt 65 against the inclined surface 69 at or during the closure member collapse, the lower portion thereof at 57 can move independently during the course of drawing the disc portions together without affecting the pivotal movement of the lower angular lever 55, and depending upon the direction of closure movement. Similarly, since the coil spring 72 upon independent pivotal movement of the lower angular lever 55 will be carried by the surface 74 forming the base of the lug 73, pivotal movement of the lower angular lever 55 can also take place similarly without affecting the pivotal portion of the upper angular lever 54.

Thus, it should be clear that a relatively simple and compact double counterbalancing arrangement has been devised which is capable of being used in and during the course of initiating movement of the closure member in either the opening or closing of the valve. In view of the lower lever angular portion 58 being received within the bifurcated base portion, designated 75, it should be clear as previously described as to the manner in which the independent movement of each of the said lever can take place. This construction will retain the discs in collapsed position as well as move the two discs together in collapsed position in either direction regardless of the position of the valve in the pipe line.

While several embodiments have been described in connection with the structure, it should, of course, be apparent that other modifications may also be used within the spirit of this invention as defined by the appended claims.

We claim:

1. In a conduit type of valve comprising a closure member consisting of a pair of discs, the said discs being placed in back-to-back relation, one of the said discs being the actuating portion of the said closure member, the other of said discs being a floating disc and being carried by the said actuating portion, each of the said discs having therebetween converging inclined surfaces serving as the wedging means upon relative movement therebetween to cause the said discs to be transversely spread apart upon predetermined axial movement of the said closure member in either direction, stop means for at least one of the said discs for limiting the travel of said closure member, means for effecting the collapse of the said discs during the course of such movement, the said latter means comprising an angular lever of L-form pivotally mounted between the discs, one of the said discs carrying a pin and an arm support for said pivotal mounting of the said angular lever, the other of said discs having a recess open to receive an end portion of the said angular lever and having an upper transverse surface defining one limit of the said recess, extendible means within the said recess adjustably positioned on the end portion of said angular lever, the said extendible means having an end limit normally abutting against the said transverse surface defining the upper limit of the said recess, means carried by said lever for fixing the degree of extension of the said extendible means, resilient means interposed between a lower depending end portion of the said angular lever and a transverse inner surface of the said actuating portion of the closure member, the said resilient means being deflectable under load applied by weight of the floating disc whereby to allow the said converging inclined surfaces to be in substantial contact when said closure member is in the collapsed position during the course of valve opening or closing movement.

2. In a conduit type of valve comprising a divided closure member consisting of a pair of discs, the said discs being placed in back-to-back relation, one of the said discs being the actuating portion of the closure member, the other of said discs being of the floating type and being carried by the said actuating portion, each of the said discs having therebetween converging inclined surfaces serving as the wedging means upon the occurrence of relative transverse movement therebetween to cause the said discs to be spread apart upon predetermined axial movement of the said closure member within the valve in either direction, stop means for at least one of the said discs for limiting the travel of said closure member, means for effecting the collapse of the said discs upon the initiation of such movement, the said collapsing means comprising an angular lever of L-configuration with arms positioned between the discs, the actuating portion of said discs carrying transverse support means for pivotally mounting the said angular lever, the latter pivotal mounting being substantially at the juncture of the arms of L-configuration, the other of said discs having a chamber portion to receive an arcuately movable arm extension of the said angular lever, adjustable stop means on an end portion of the said angular lever, the said stop means normally bearing against an upper limit of the chamber portion of the said other disc, an upper inner surface of the latter disc defining one limit of the chamber portion to establish the degree of movement of the arcuately movable lever between said discs, resilient means transversely extending relative to the discs and being interposed between a depending arm of the angular lever and an inner surface of the actuating portion of the closure member thereby to counterbalance the weight of the floating disc relative to the actuating disc in collapsing the said disc assembly in the course of valve movement.

3. In a conduit type of valve comprising a split closure member consisting of a pair of discs with ported portions, the said discs being placed in back-to-back relation, one of the said discs being the actuating portion of the closure member, the other of said discs being of the floating type and being carried by the said actuating portion, stop means for at least one of the said discs effective at the valve open and closed position for limiting the travel of said closure member, each of the said discs having therebetween converging inclined relieved surfaces serving as the wedging means to cause the said discs to be transversely spread apart upon predetermined axial movement of the said closure member and relative movement of the actuating portion relative to the floating disc thereof, means for effecting the collapse of the said discs in initiating the said movement, the said collapsing means comprising an L-lever postioned between inner faces of the discs, one of the said discs pivotally supporting the said L-lever, the said discs having therebetween a hollow portion to receive an end portion of the said L-lever, one of said discs having an upper inner surface defining one limit of the said hollow portion, adjustable stop means on the end portion of the said L-lever, the said adjustable stop means normally abutting against the said surface defining the upper limit of the hollow portion in the uncollapsed position of the said closure member, resilient means interposed between a pivotally movable leg of the said L-lever and a transverse surface of the actuating portion of the closure member for predeterminately resisting the pivotal movement of the L-lever in the course of collapsing said closure member, the said stop means being accessible for adjustment through side openings between the discs when assembled, the latter openings communicating with the said hollow portion between the said discs.

4. In a conduit type of valve comprising a reciprocally movable divided closure member consisting of a pair of discs, the said discs being placed in back-to-back relation, one of the said discs including the actuating portion for the said closure member, the other of said discs being of the floating type and being engageable with and carried by the said actuating portion disc, stop means for at least one of said disc effective at either end of disc travel for limiting the reciprocal movement of said closure member, each of the said discs having therebetween converging inclined surfaces serving as the wedging means upon occurrence of relative movement therebetween to cause the said discs to be transversely spread apart upon predetermined axial movement of the said closure member, counterbalanced means for effecting the collapse of the said discs during the course of said reciprocal movement, the said latter means comprising at least one angular lever between the discs, at least one of the said discs pivotally supporting the said angular lever, the said discs having therebetween a hollow portion to receive an end of the said angular lever and having an upper inclined surface defining one limit of said hollow portion, adjustable means on an end portion of the said angular lever normally bearing against the said upper inclined surface during the course of valve movement to draw said discs together, means interposed between a pivotally movable end of at least one of the angular levers and a transverse surface of one of the said discs comprising the closure member thereby to resist resiliently the pivotal movement of at least one of the said angular levers in initially actuating the said closure member preliminary to reciprocal movement of the closure member in the course of valve operation.

5. In a conduit type of valve comprising a divided closure member consisting substantially of a pair of assembled discs, the said discs being placed in back-to-back relation, one of the said discs being the actuating portion of the closure member, the other of said discs being of the floating type and being carried by the said actuating portion, stop means for at least one of said discs effective at open and closed positions of the valve for limiting the travel of the said closure member, each of the said discs having therebetween converging inclined surfaces thereon serving as the wedging means upon the occurrence of relative transverse movement therebetween to permit the said discs to be spread apart upon predetermined axial movement of the said closure member within the valve, means for effecting the collapse of the said discs upon the initiation of such movement, the said collapsing means comprising a plurality of pivotal angular levers of substantially L-configuration in superposed relation between the said discs on each side thereof, the actuating portion of said discs carrying support means for pivotally carrying the said angular levers substantially at the juncture of the lever L-configuration, the said discs having a hollow or chamber portion therebetween to receive arcuately movable extensions of the said angular levers, adjustable stop means on end portions of the said angular lever, the said stop means predeterminately bearing against the upper and lower surface limits of the chamber portion between the said discs thereby to define a limit in the pivotal movement of the said arcuately movable levers, resilient means interposed between extensions of the said angular levers and transverse surfaces forming a portion of the chamber of the said discs whereby to support a portion of the weight of one of the discs and to counterbalance the force of such latter load in the course of collapsing the said disc assembly.

References Cited in the file of this patent

UNITED STATES PATENTS

| | | |
|---|---|---|
| 2,031,372 | Kiesel | Feb. 18, 1936 |
| 2,504,924 | Fennema | Apr. 18, 1950 |
| 2,541,968 | Laurent | Feb. 13, 1951 |
| 2,583,512 | Laurent | Jan. 22, 1952 |